R. M. RAGER.
NUT LOCK.
APPLICATION FILED AUG. 20, 1909.
968,979.
Patented Aug. 30, 1910.
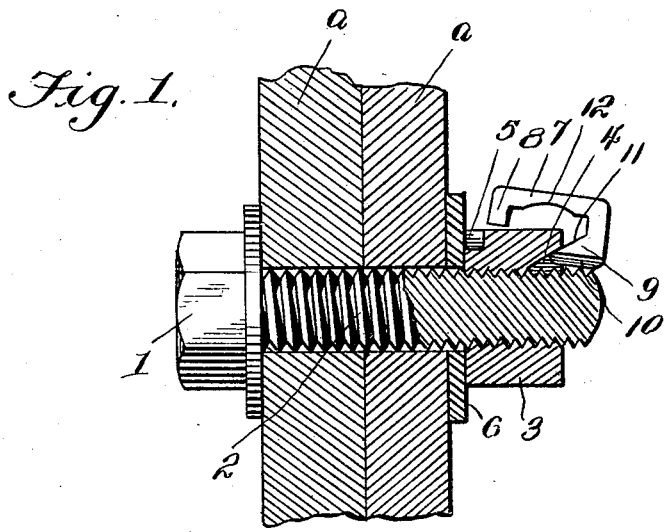
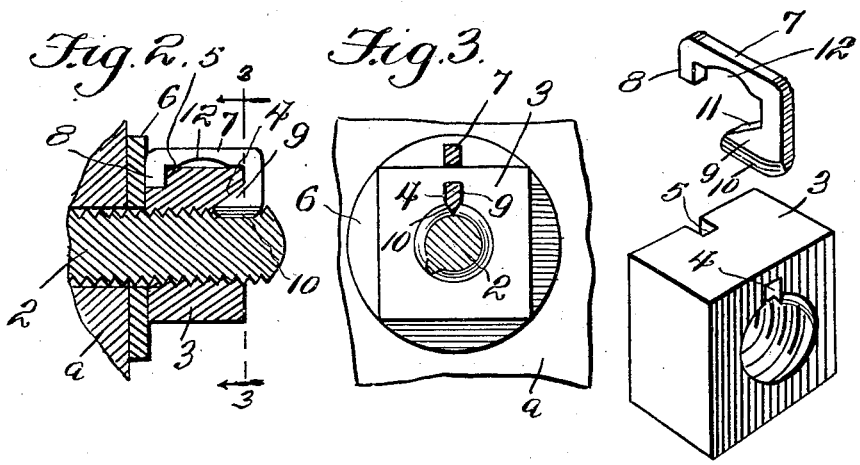
Witnesses
Inventor
Reuben M. Rager,
By Victor J. Evans,
Attorney

UNITED STATES PATENT OFFICE.

REUBEN M. RAGER, OF MILLWOOD, PENNSYLVANIA, ASSIGNOR OF ONE-THIRD TO JOSEPH J. GILLIGAN, OF LATROBE, PENNSYLVANIA, AND ONE-FOURTH TO ALFRED F. KESTNER, OF MILLWOOD, PENNSYLVANIA.

NUT-LOCK.

968,979.  Specification of Letters Patent. Patented Aug. 30, 1910.

Application filed August 20, 1909. Serial No. 513,811.

*To all whom it may concern:*

Be it known that I, REUBEN M. RAGER, a citizen of the United States of America, residing at Millwood, in the county of Westmoreland and State of Pennsylvania, have invented new and useful Improvements in Nut-Locks, of which the following is a specification.

This invention relates to nut locks, and one of the principal objects of the same is to provide a nut lock of simple construction which can be quickly attached to the nut to lock the same upon the bolt and which can also be readily removed therefrom in case it is desired to readjust the nut upon the bolt.

Another object of the invention is to provide a reliable and efficient nut lock comprising a spring having a sharpened edge adapted to cut into the threads of a bolt, said spring being detachably connected to the nut for preventing the same from turning off the bolt.

These and other objects may be attained by means of the construction illustrated in the accompanying drawing, in which,—

Figure 1 is a view in elevation and partial section of a bolt and nut lock made in accordance with my invention, the nut lock being shown in position ready for attachment to the nut. Fig. 2 is a sectional view, showing the nut locked to the bolt. Fig. 3 is a vertical sectional view on the line 3—3 of Fig. 2, looking in the direction indicated by the arrows. Fig. 4 is a detail perspective of the lock. Fig. 5 is a similar view of the nut.

Referring to the drawing, the numeral 1 designates the head of the bolt, and 2 is the threaded shank thereof. This bolt may be of any suitable construction having a rounded polygonal or square head and threads of any required pitch upon the shank 2. The nut 3 is provided with threads to fit the bolt and at one side has a recess or notch 4. This notch has an inclined upper wall which extends from the outer wall of said nut through the threaded portion thereof. A recess 5 is formed at the rear upper portion of the nut, as shown in Figs. 1 and 4 and extends a suitable distance from the outer surface of the nut. A washer 6 may be used if desired. However, this is not essential to the use of my invention.

The nut lock comprises a spring made of a single piece of steel and preferably provided with a flat bar 7 having at one end a downturned short lug 8 and at the opposite end an inwardly projecting key 9 having a sharpened lower edge 10. The key 9 is provided with an inclined upper edge 11 designed to normally bear against the inclined upper wall of the recess 4 in the nut. The flat bar 7 is provided with a curved recess 12 in its underside to permit the insertion of a suitable tool for removing the lock from the nut whenever it is desired to readjust the nut or remove it from the bolt.

My nut lock is used in the following manner: After the nut 3 has been turned upon the bolt sufficiently for tightening the same against the two pieces *a*, the key 9 is inserted in the recess 4 in the nut, and by driving the lock backward slightly, the projection 8 is inserted in the recess 5. The sharpened edge 10 of the key cuts its way through the threads of the bolt to hold the nut from rotation, as clearly shown in Fig. 2 of the drawing. Whenever it is required to readjust the nut or remove it from the bolt, a suitable tool may be inserted under the bar 7 in the recess 12, and the lock is then removed from the nut. After adjustment the lock can be again replaced.

From the foregoing it will be obvious that a nut lock made in accordance with my invention may be used under many conditions and for any purpose for which a bolt and nut are available. The construction is simple, can be manufactured at slight cost and provides a reliable and efficient means for holding the nut against turning off the bolt.

I claim:—

1. In a nut lock, a bolt, a nut threadable onto the bolt and having at one end an inclined groove leading to the threaded opening of the nut and further provided at its opposite end with a recess, a resilient locking member terminating at one end in an inwardly extending lug to enter the recess and further provided at its opposite end with a substantially right angularly shaped key, having an inclined side to enter the groove of the nut, said key being further provided with a sharpened edge to engage the threads of the bolt.

2. A nut lock comprising a nut having at its outer end a tapering recess leading through the threaded portion of the nut, said nut being further provided at its inner end with a recess terminating at a suitable distance from the screw-threaded portion of the latter, a lock comprising a bar having a downwardly projecting short lug for engagement with the recess at the inner end of the nut, and an inwardly projecting key forming a part of the opposite end of the bar and adapted to be snugly received by the recess formed in the outer end of the nut, said inwardly projecting key having an upper inclined surface and a lower sharpened edge which is adapted to extend beyond the threaded bore of the nut when the bar is forced into its proper position in respect to the nut.

REUBEN M. RAGER.

Witnesses:
ALEX. H. WHITE,
A. F. KESTNER.